United States Patent
Chen et al.

(10) Patent No.: US 7,885,543 B2
(45) Date of Patent: *Feb. 8, 2011

(54) HIGH PERFORMANCE GIGABIT PASSIVE OPTICAL NETWORK

(75) Inventors: David Z. Chen, Richardson, TX (US); Joseph M. Finn, Upper Saddle River, NJ (US); Steven Gringeri, Foxboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/853,904

(22) Filed: Sep. 12, 2007

(65) Prior Publication Data

US 2009/0067838 A1    Mar. 12, 2009

(51) Int. Cl.
    *H04J 14/00* (2006.01)
(52) U.S. Cl. .......... 398/72; 398/135; 398/136; 398/68; 398/69; 385/24; 385/37; 370/352; 370/389; 370/468; 370/392

(58) Field of Classification Search ............ 398/66, 398/67, 68, 69, 70, 71, 72, 79, 98, 99, 100, 398/59, 58, 83, 158, 159, 160, 182, 183, 398/186, 192, 194, 201, 135, 136, 85, 202, 398/212, 164; 385/24, 37, 88, 89, 90, 92, 385/93; 370/352, 392, 389, 468, 465
See application file for complete search history.

(56) References Cited

U.S. PATENT DOCUMENTS

| | | | |
|---|---|---|---|
| 5,337,175 A * | 8/1994 | Ohnsorge et al. ........ | 398/72 |
| 2006/0239683 A1* | 10/2006 | Park et al. ............. | 398/71 |
| 2007/0183779 A1* | 8/2007 | Bouda et al. ........... | 398/72 |
| 2008/0013950 A1* | 1/2008 | Boudreault et al. ...... | 398/59 |
| 2009/0154925 A1* | 6/2009 | Chen .................. | 398/58 |

* cited by examiner

*Primary Examiner*—Hanh Phan

(57) ABSTRACT

A device determines a bandwidth demand for traffic provided between a line terminal (LT) and multiple optical network terminals (ONTs), and dynamically tunes, based on the determined bandwidth demand, one or more tunable filters provided in the LT and the multiple ONTs to one of balance the traffic, protect the traffic, or increase available bandwidth for the traffic.

23 Claims, 11 Drawing Sheets

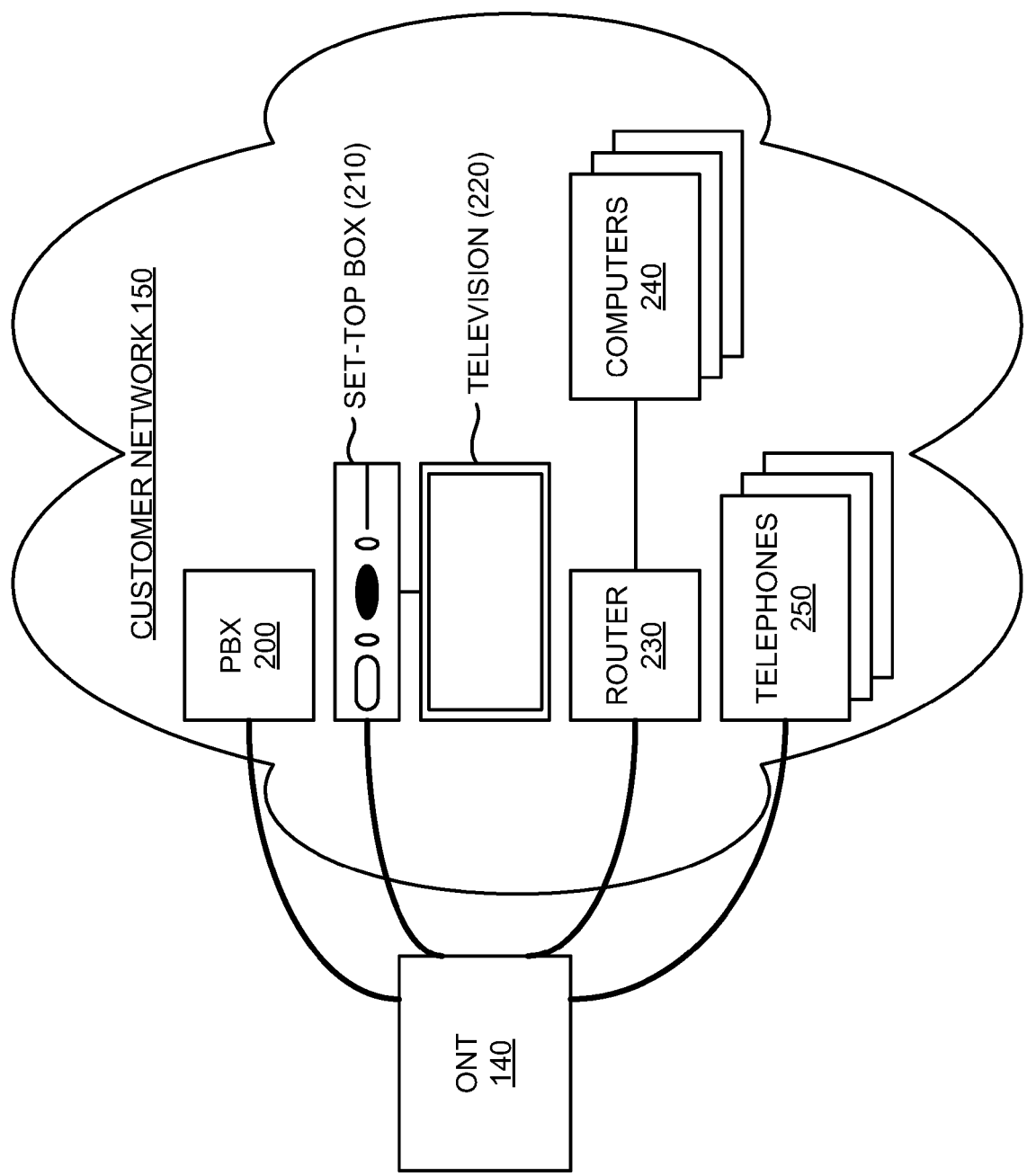

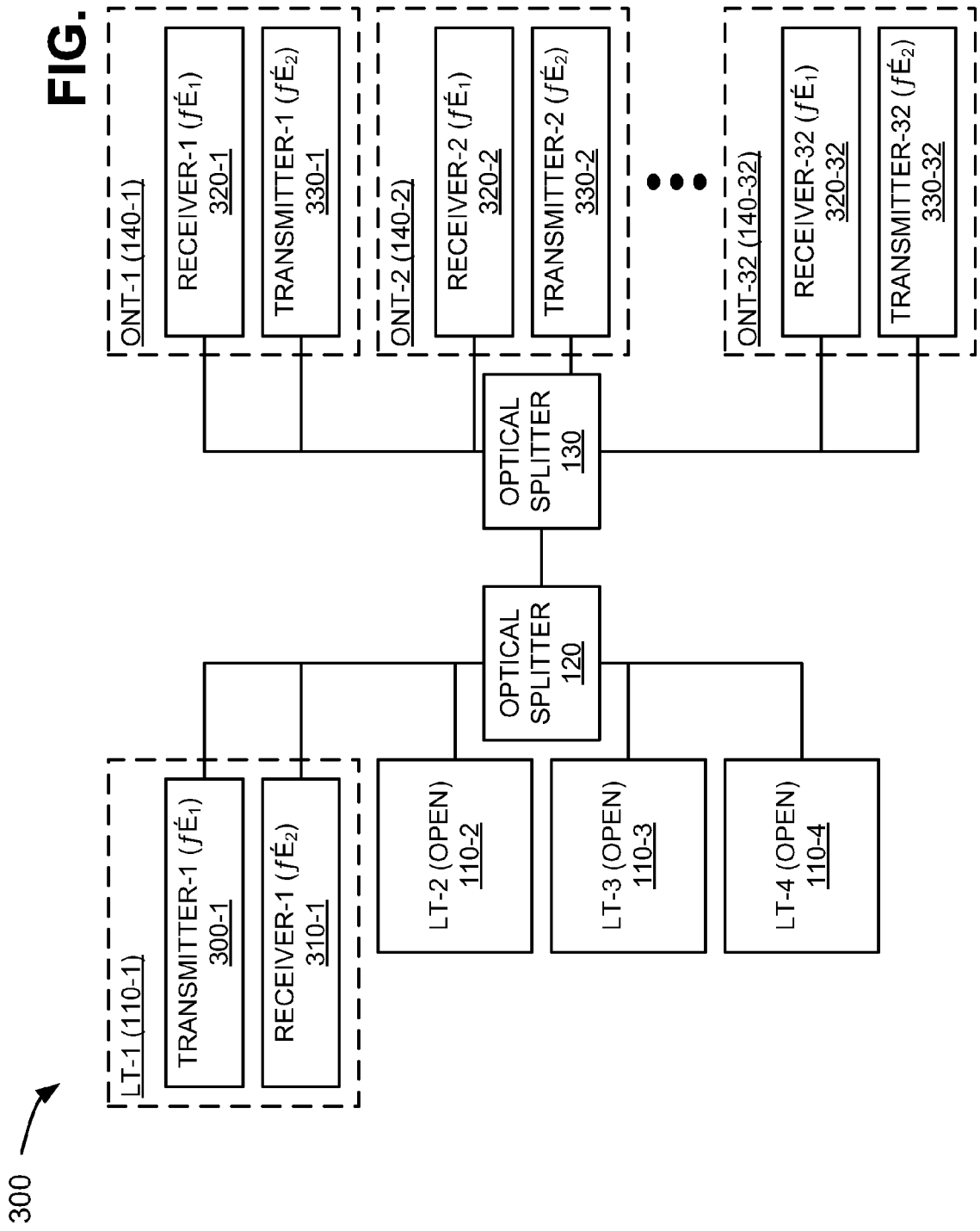

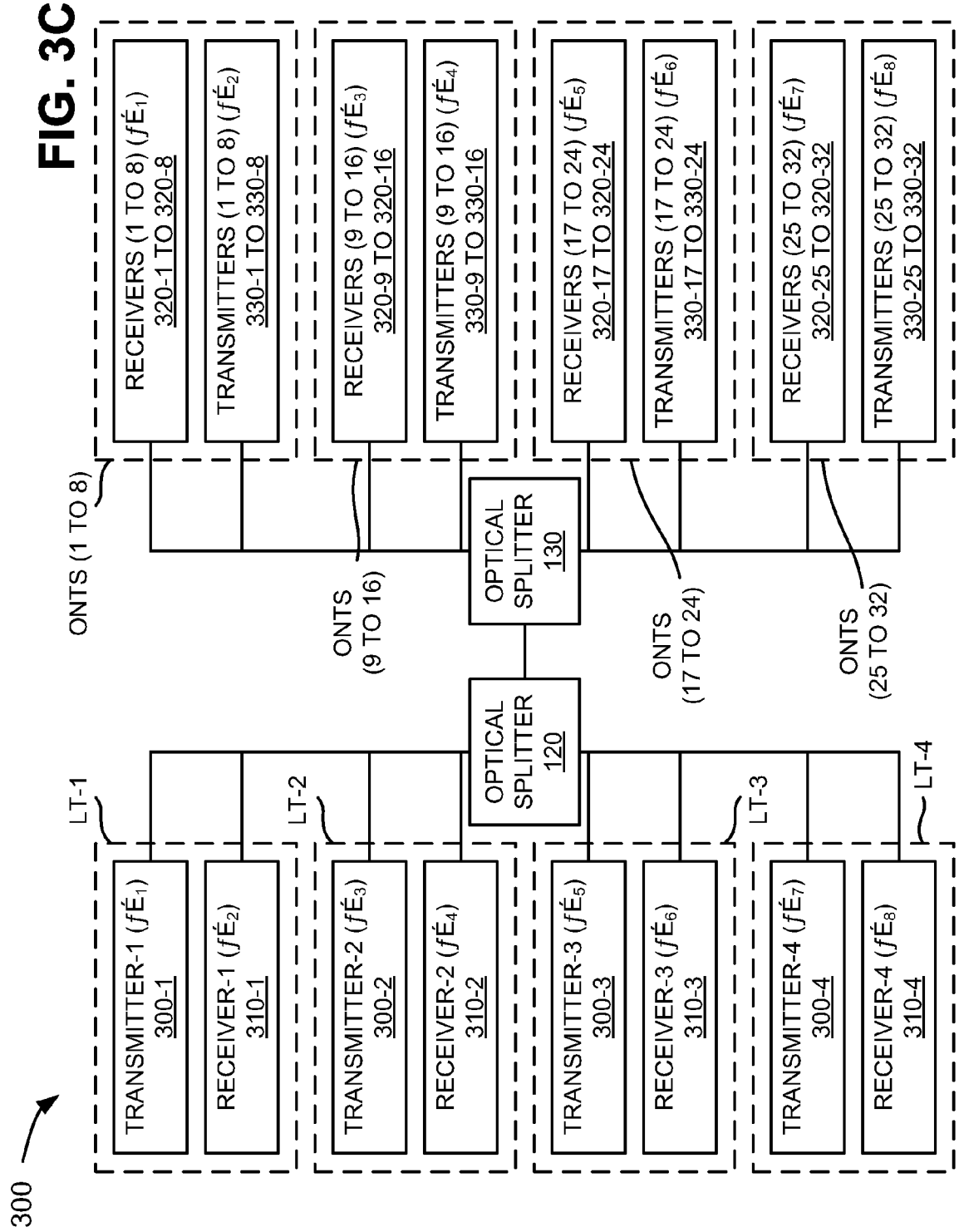

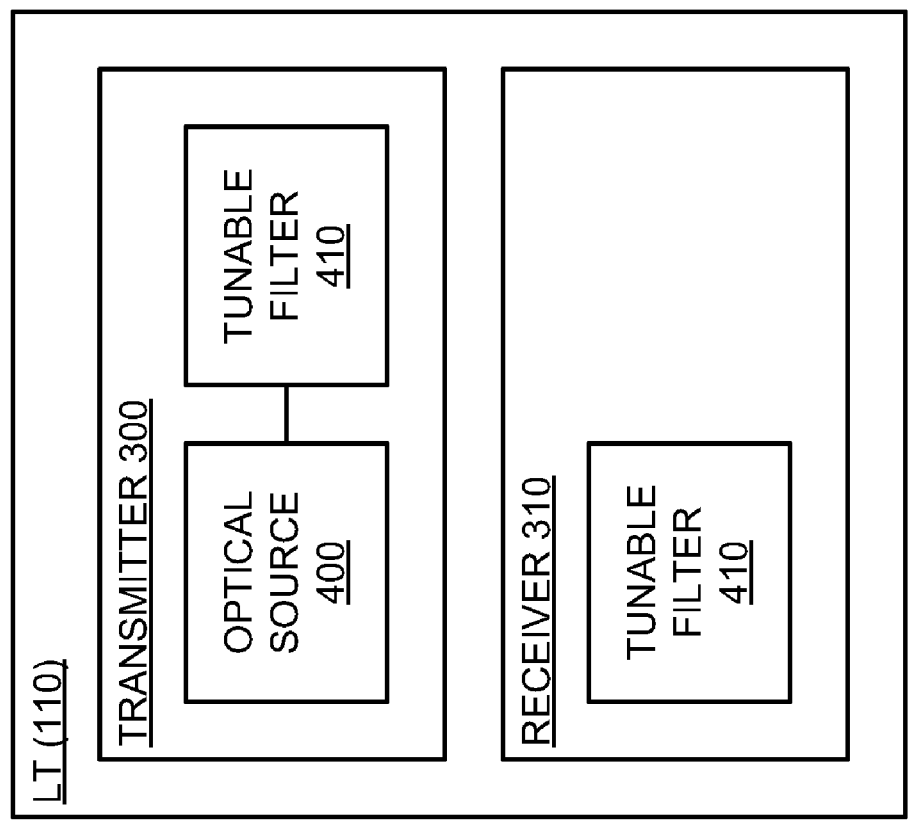

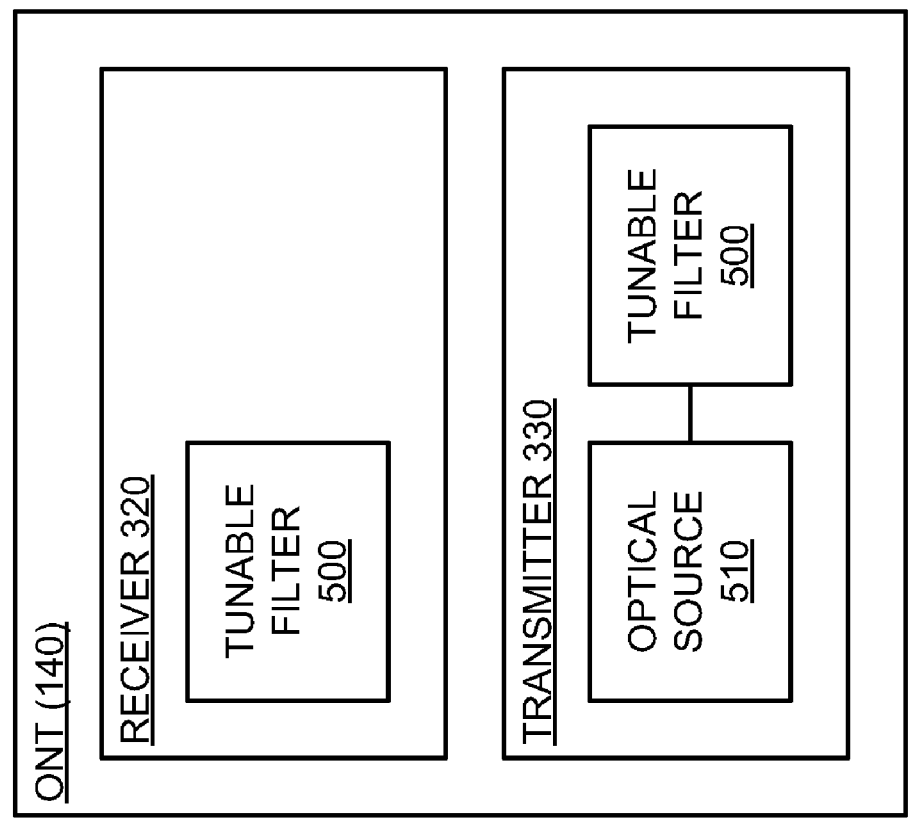

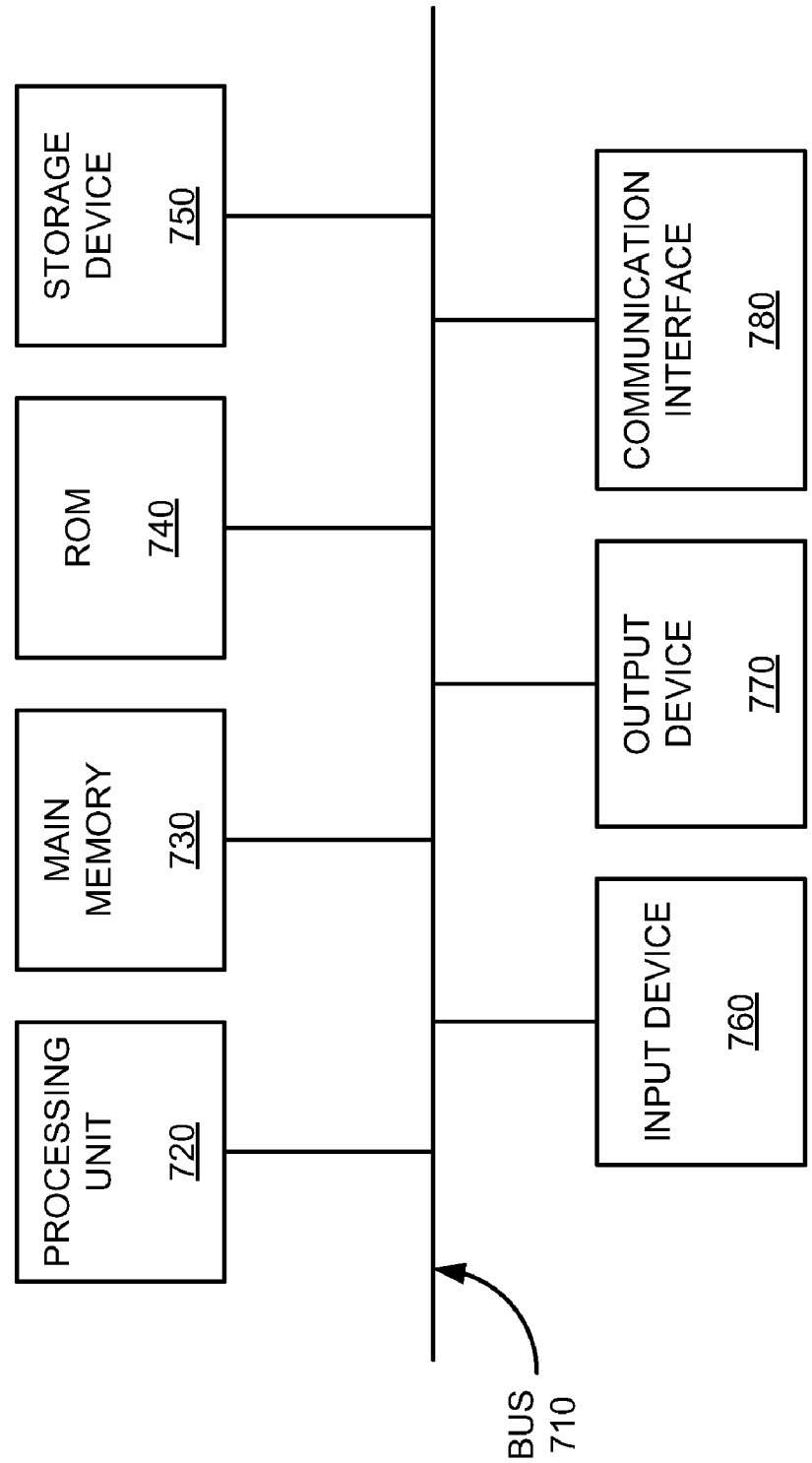

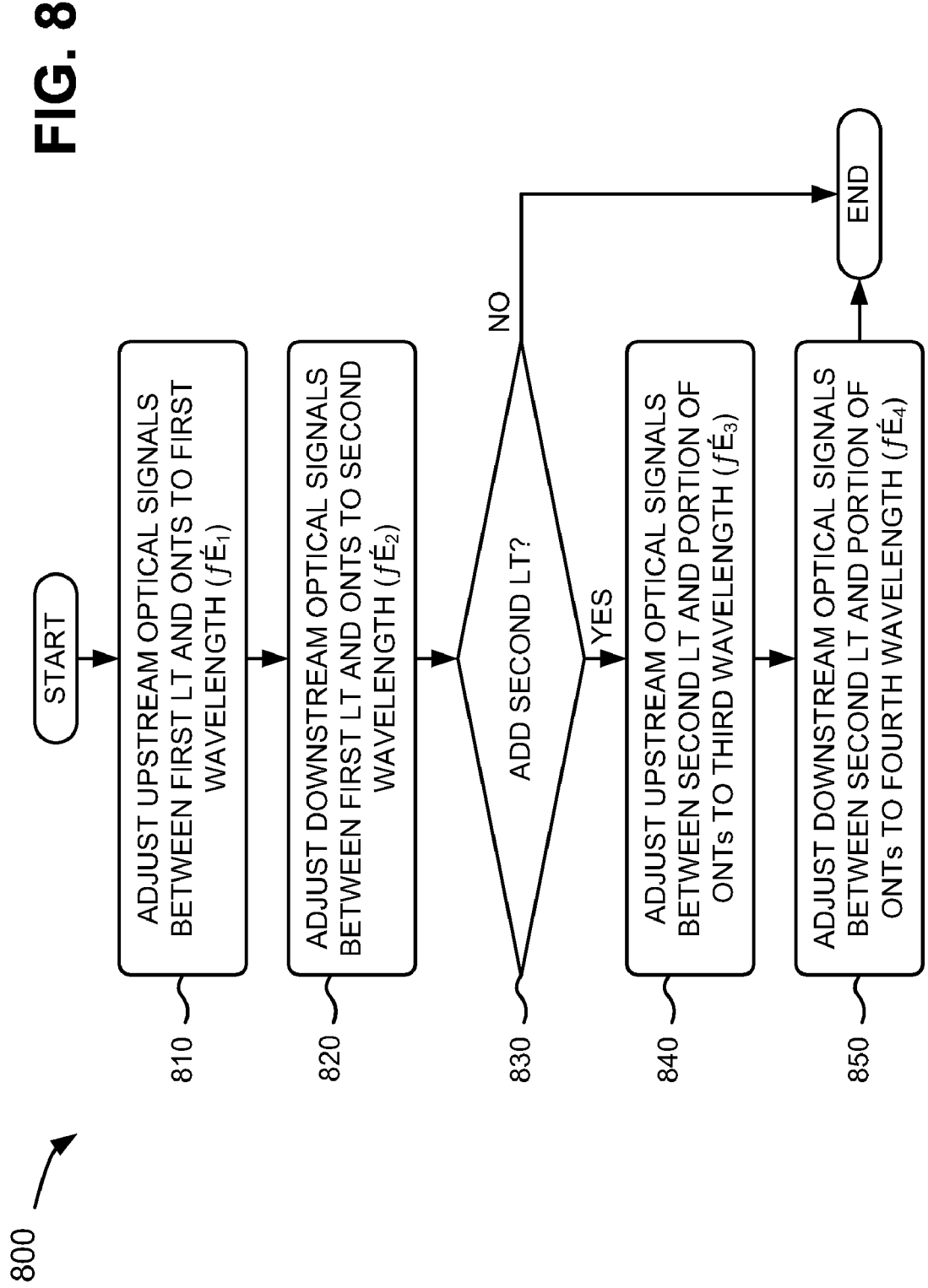

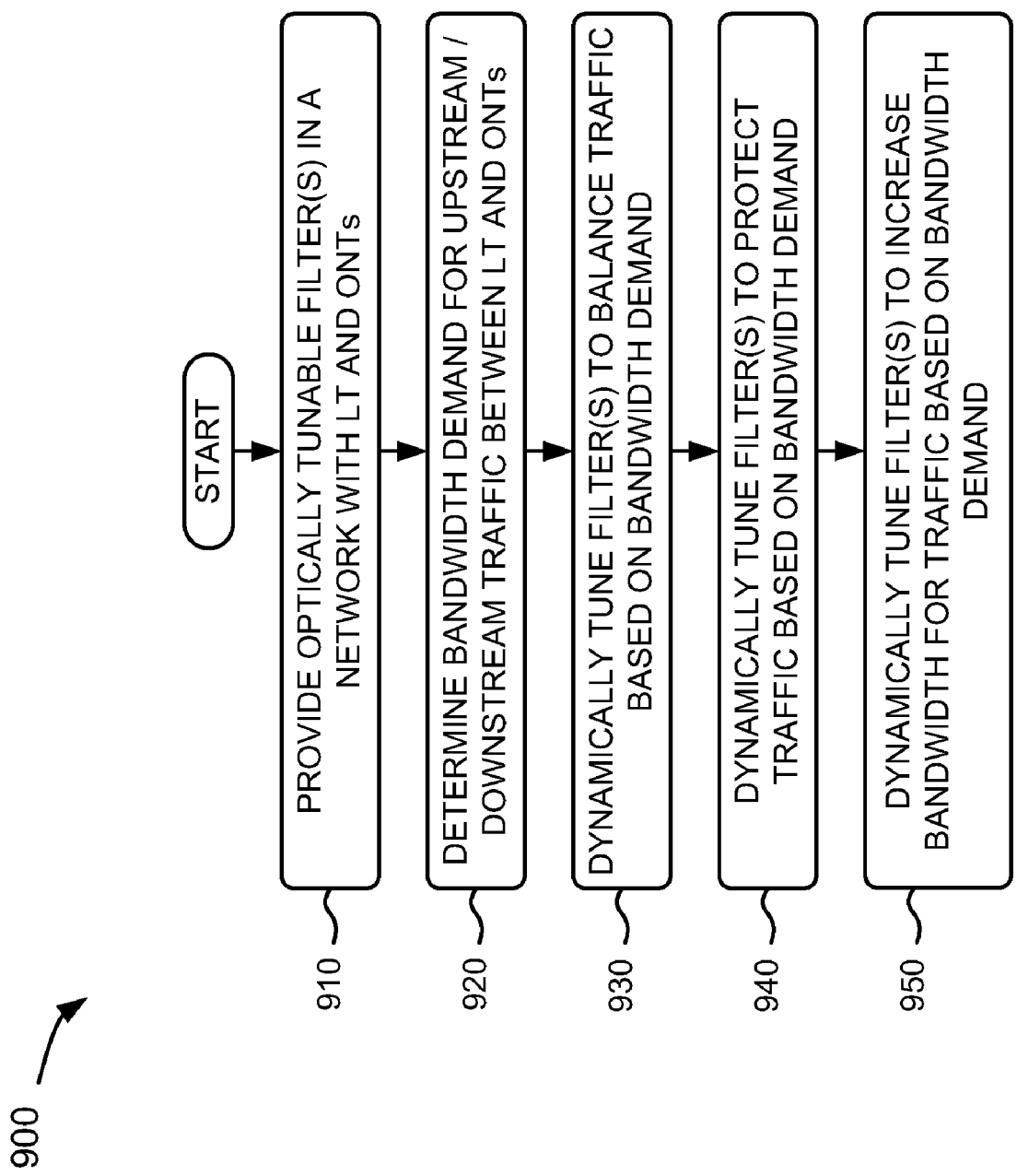

HIGH PERFORMANCE GIGABIT PASSIVE OPTICAL NETWORK

BACKGROUND

A passive optical network (PON) is a point-to-multipoint, fiber to premises network architecture in which optical splitters are used to enable a single optical fiber to serve multiple premises (e.g., customers or end users). A PON may include an optical line termination (OLT) and an optical network termination or terminal (ONT) interconnected by a passive optical distribution network (ODN). One or more OLTs may be located at a service provider's central office. One or more ONTs may be located at customers' premises. An OLT may include one or more line terminals (LTs or PON-LTs) that communicate with a unique set of ONTs, and there may be a one-to-many relationship between an LT and the ONTs. Downstream traffic (e.g., optical signals) may be broadcast from an LT to all associated ONTs. The downstream traffic may be addressed to specific ONTs and unaddressed ONTs may ignore the traffic, and encryption may be used to prevent eavesdropping. Upstream traffic (e.g., optical signals) may be sent from the ONTs to an associated LT, and the OLT may combine the upstream traffic from all of its LTs using a multiple access protocol.

A gigabit PON (G-PON) is a PON that supports higher traffic rates, enhanced security, and Layer 2 protocols. Downstream traffic in a G-PON may be broadcast from each LT to ONTs associated with the LT at a data rate of "2.5" gigabits per second (G/s or Gbps). Upstream traffic may be sent from each ONT to the LT at a data rate of "1.25" G/s. A G-PON may provide different services (e.g., video (e.g., television), data (e.g., high-speed Internet access), and/or voice (e.g., telephone) services) over a single optical connection with each ONT.

BRIEF DESCRIPTION OF THE DRAWINGS

FIG. 2 is an exemplary diagram of a customer network of the network depicted in FIG. 1;

FIG. 3A illustrates a portion of the network depicted in FIG. 1, where the portion of the network may include a single operational line terminal (LT);

FIG. 3C illustrates a portion of the network depicted in FIG. 1, where the portion of the network may include four operational line terminals (LTs);

FIG. 4 is a diagram depicting exemplary components of a line terminal (LT) of the network depicted in FIG. 1;

FIG. 5 is a diagram depicting exemplary components of an optical network terminal (ONT) of the network depicted in FIG. 1;

FIG. 7 illustrates exemplary components of a remote controller of the network depicted in FIG. 6; and FIGS. 8 and 9 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and methods that provide dynamically tunable filters in a network (e.g., a G-PON) that includes one or more optical line terminations (OLTs) (e.g., at a central office) and one or more optical network terminals (ONTs) (e.g., at end users' premises). Each OLT may include one or more line terminals (LTs) that may communicate with associated ONTs. For example, in one implementation, the systems and methods may determine bandwidth demand for upstream and/or downstream traffic between the LTs and the ONTs, and/or may dynamically tune the filters to balance traffic based on the determined bandwidth demand. Such a technique may dynamically rearrange bandwidth among the ONTs. The systems and methods may also dynamically tune the filters to protect the traffic and/or to increase bandwidth for the traffic based on the determined bandwidth demand. Such a technique may permit LTs to be added to increase available bandwidth shared among a group of ONTs.

Figure 1:
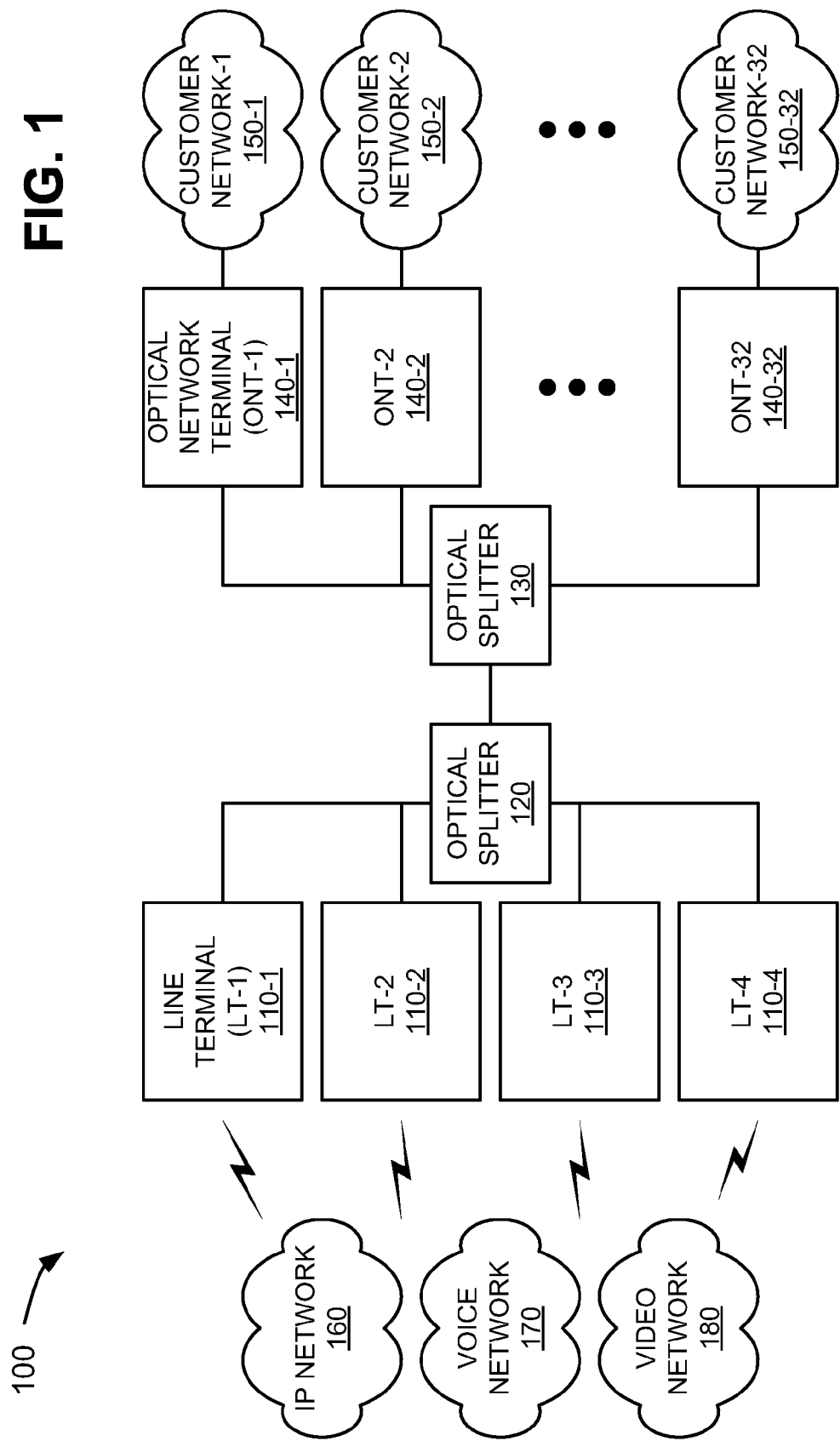
FIG. 1 is an exemplary diagram of a network in which systems and methods described herein may be implemented.

FIG. 1 is an exemplary diagram of a network 100 in which systems and methods described herein may be implemented. As illustrated, network 100 may include one or more line terminals (LTs) 110-1, 110-2, 110-3, and 110-4 (collectively referred to as "LTs 110" or individually as "LT 110"), optical splitters 120 and 130, one or more optical network terminals (ONTs) 140-1, 140-2, . . . , 140-32 (collectively referred to as "ONTs 140" or individually as "ONT 140"), one or more customer networks 150-1, 150-2, . . . , 150-32 (collectively referred to as "customer networks 150" or individually as "customer network 150") associated with corresponding ONTs 140, an Internet Protocol (IP) network 160, a voice network 170, and/or a video network 180. Four LTs, two optical splitters, thirty-two ONTs, and multiple networks have been illustrated in FIG. 1 for simplicity. In practice, there may be more or less LTs, optical splitters, ONTs, and/or networks. Also, in some instances, one of LTs 110 may perform one or more functions performed by another one of LTs 110. In one implementation, LTs 110, optical splitters 120 and 130, and ONTs 140 may form a G-PON. In other implementations, LTs 110, optical splitters 120 and 130, and ONTs 140 may form other types of PONs (e.g., a broadband PON (B-PON), an Ethernet PON (E-PON), etc.).

LTs 110 may reside in an optical line termination (OLT) provided at a central office (e.g., of a service provider), and each LT 110 may include a device that terminates a PON, and provides an interface between the PON and other networks (e.g., IP network 160, voice network 170, video network 180, etc.). In one implementation, each LT 110 may provide Ethernet aggregation capabilities and/or link aggregation on ports for additional capacity and/or traffic protection. LTs 110 may receive information (e.g., from IP network 160, voice network 170, video network 180, etc.), and/or may send the information as downstream traffic (e.g., optical signals) to ONTs 140. LTs 110 may manage upstream traffic provided by ONTs 140 by informing ONTs 140 when they can and/or cannot transmit upstream traffic. Further details of LTs 110 are provided below in connection with FIG. 4.

Optical splitter 120 may include an optical device (e.g., a 1:4 optical splitter) that splits a beam of light (e.g., upstream traffic provided by ONTs 140) into four beams of light (e.g., multiple paths of optical signals). For example, in one implementation, optical splitter 120 may receive a single beam of light (e.g., upstream traffic) from optical splitter 130, may split the beam of light into four beams of light, and may provide each of the four beams of light to one of LTs 110. In other implementations, optical splitter 120 may receive one to four beams of light (e.g., downstream traffic) from LTs 110 (e.g., one from each LT 110), and may pass the four beams of light as a single beam of light to optical splitter 130.

Optical splitter 130 may include an optical device (e.g., a 1:32 optical splitter) that splits a beam of light (e.g., downstream traffic provided by LTs 110) into thirty-two beams of light. For example, in one implementation, optical splitter 130 may receive a single beam of light (e.g., downstream traffic) from optical splitter 120, may split the beam of light into thirty-two beams of light, and may provide each of the thirty-two beams of light to one of ONTs 140. In other implementations, optical splitter 130 may receive one to thirty-two beams of light (e.g., upstream traffic) from ONTs 140 (e.g., one from each ONT 140), and may pass the one or more beams of light as a single beam of light to optical splitter 120.

ONTs 140 may reside at customers' premises and each ONT 140 may include a device that terminates a PON, and provides an interface between the PON and the customer's premises (e.g., customer networks 150, etc.). In one implementation, each ONT 140 may provide multiple service interfaces for the customer (e.g., it may provide an interface for telephony (i.e., voice) services, an interface for Ethernet (i.e., data) services, an interface for television (i.e., video) services, etc.). ONTs 140 may receive information (e.g., from customer network 150, etc.), and/or may send the information as upstream traffic (e.g., optical signals) to LTs 110. ONTs 140 may receive downstream traffic (e.g., from IP network 160, voice network 170, video network 180, etc.) provided by LTs 110, and/or may send the downstream traffic to devices provided in customer network 150. Further details of ONTs 140 are provided below in connection with FIG. 5.

Each of customer networks 150 may include a local area network (LAN), a wide area network (WAN), or a combination of networks that provide data, voice, and/or television services to the customer or end user. In one implementation, each of customer networks 150 may include a network interconnecting one or more devices providing data services (e.g., personal computers, workstations, laptops, etc.), one or more devices providing voice services (e.g., telephones), and/or one or more devices providing video services (e.g., televisions, set-top boxes, etc.). Further details of customer networks 150 are provided below in connection with FIG. 2.

IP network 160 may include a LAN, a WAN, a metropolitan area network (MAN), an intranet, the Internet, or a combination of networks that provide data services. In one implementation, IP network 160 may include the Internet, and/or a network that provides access to the Internet.

Voice network 170 may include a Public Land Mobile Network (PLMN), a telephone network, such as the Public Switched Telephone Network (PSTN) or a cellular telephone network, or a combination of networks that provide voice services (e.g., telephony services). In one implementation, voice network 170 may include a Synchronous Optical Network (SONET)-based network, the PSTN network, a voice media gateway, etc.

Video network 180 may include a LAN, a MAN, a WAN, the Internet, an intranet, a PSTN, or a combination of networks that provide video (e.g., television) services. In one implementation, video network 180 may include one or more content servers that provide television programming, video content (e.g., movies, on-demand services, live television, etc.), etc. to a set-top box and a television monitor, one or more video encoders, etc.

The arrangement of network 100 may enable omission of components typically used in optical networks. For example, in one implementation, network 100 may omit an optical array waveguide, an optical interlever, an optical multiplexer, an optical de-multiplexer, an optical isolator, etc. Omission of such components may reduce the cost and/or complexity of network 100.

Although FIG. 1 shows exemplary components of network 100, in other implementations, network 100 may contain fewer, different, or additional components than depicted in FIG. 1. In still other implementations, one or more components of network 100 may perform one or more other tasks performed by one or more other components of network 100.

FIG. 2 is an exemplary diagram of a single customer network 150. As illustrated, customer network 150 may connect to a single ONT 140, and may include a variety of components (e.g., provided at the customer's premises). For example, customer network 150 may include a private branch exchange (PBX) 200, a set-top box 210 and a corresponding television monitor 220, a router 230 and one or more corresponding computers 240, and/or telephones 250 interconnected with ONT 140.

PBX 200 may include a private telephone network that may be used within an organization. Users of PBX 200 may share a number of outside lines for making telephone calls external to PBX 200.

Set-top box (STB) 210 may include a device that may connect to a communication channel (e.g., a cable television line) and may produce output on a television screen (e.g., television monitor 220). Set-top box 210 may be used to receive and decode digital television broadcasts and provide the television broadcasts to television monitor 220 for display to a user. Set-top box 210 may receive and unscramble incoming television signals, and/or may execute a variety of advanced services (e.g., videoconferencing, home networking, IP telephony, video-on-demand (VoD), high-speed Internet television services, etc.). Television monitor 220 may include any conventional television monitor that is capable of displaying television programming.

Router 230 may include a device that forwards information to one or more of computers 240. In one implementation, router 230 may include a wired or wireless routing device that forwards information from ONT 140 to one or more of computers 240. For example, router 230 may provide Internet access to multiple computers 240 provided at the customer's premises.

Computers 240 may include computing devices, such as personal computers, personal digital assistants (PDAs), laptops, or other types of computation or communication devices, threads or processes running on these devices, and/or objects executable by these devices.

Telephones 250 may include one or more types of telephone devices that are capable of providing telephony services (e.g., to the customer). For example, telephones 250 may include any devices capable of receiving voice services (e.g., from voice network 170) and/or voice-over-IP (VOIP) services (e.g., from IP network 160).

Although FIG. 2 shows exemplary components of customer network 150, in other implementations, customer network 150 may contain fewer, different, or additional components than depicted in FIG. 2. In still other implementations, one or more components of customer network 150 may perform one or more other tasks described as being performed by one or more other components of customer network 150.

FIG. 3A illustrates a portion 300 of network 100, where network portion 300 may include a single operational LT 110 (e.g., LT-1 (110-1)). The remaining LTs 110 (e.g., LT-2 (110-2), LT-3 (110-3), and LT-4 (110-4)) of network portion 300 may be unused. Such an arrangement may be used, for example, if G-PON services are initially being provided to customers.

As shown in FIG. 3A, LT-1 (110-1) may include a transmitter 300-1 and a receiver 310-1. Transmitter 300-1 may include any device capable of transmitting optical signals (e.g., downstream traffic). In one implementation, transmitter 300-1 may include a device capable of transmitting optical signals at a first wavelength ($\lambda_1$). In one example, the first wavelength ($\lambda_1$) may include a wavelength in a range of about "1450" nanometers (nm) to about "1458" nm. Receiver 310-1 may include a device capable of receiving optical signals (e.g., upstream traffic). In one implementation, receiver 310-1 may include a device capable of receiving optical signals at a second wavelength ($\lambda_2$). In one example, the second wavelength ($\lambda_2$) may include a wavelength in a range of about "1550" nanometers (nm) to about "1558" nm.

As further shown in FIG. 3A, ONT-1 (140-1), ONT-2 (140-2), ..., ONT-32 (140-32) may each include a receiver 320-1, 320-2, ..., 320-32 (collectively referred to as "receivers 320" or individually as "receiver 320"), respectively, and a transmitter 330-1, 330-2, ..., 320-32 (collectively referred to as "transmitters 330" or individually as "transmitter 330"), respectively. Receivers 320 may include any devices capable of receiving optical signals (e.g., downstream traffic). In one implementation, receivers 320 may include devices capable of receiving optical signals at the first wavelength ($\lambda_1$). Transmitters 330 may include any devices capable of transmitting optical signals (e.g., upstream traffic). In one implementation, transmitters 330 may include devices capable of transmitting optical signals at the second wavelength ($\lambda_2$).

In such an arrangement, LT-1 (110-1) may distribute bandwidth (e.g., of "2.5" G/s) among ONTs 140. In one implementation, LT-1 (110-1) may evenly distribute bandwidth among ONTs 140. In other implementations, LT-1 (110-1) may allocate bandwidth to ONTs 140 based on bandwidth demands of ONTs 140. For example, if ONT-1 (140-1) requires more bandwidth than the other ONTs 140, LT-1 (110-1) may allocate additional bandwidth to ONT-1 (140-1).

Figure 3B:
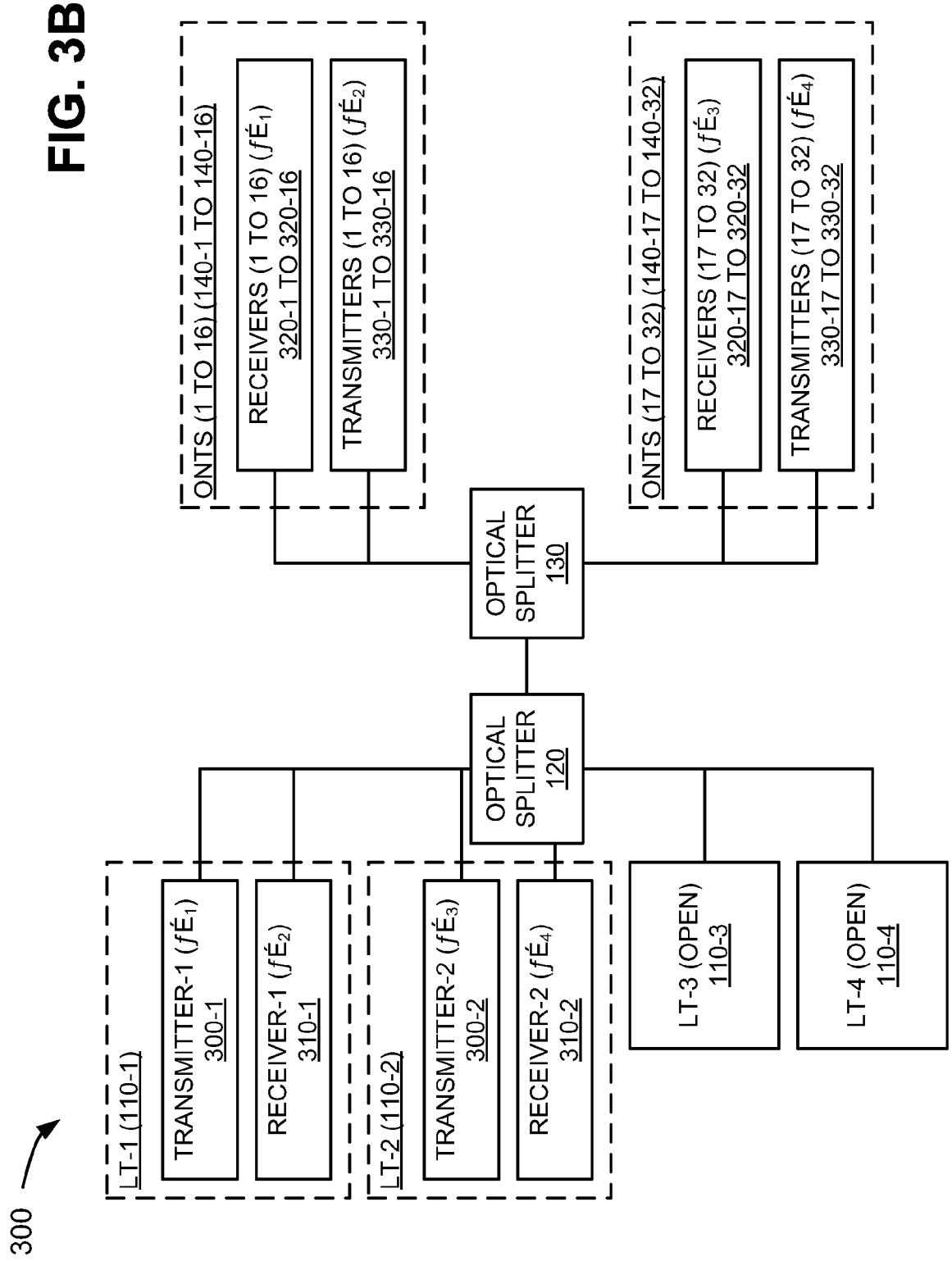
FIG. 3B illustrates a portion of the network depicted in FIG. 1, where the portion of the network may include two operational line terminals (LTs)

If the bandwidth demands of ONTs 140 exceed the bandwidth provided by LT-1 (110-1), network portion 300 may be upgraded by adding another operational LT. FIG. 3B illustrates network portion 300 that may include two operational LTs 110 (e.g., LT-1 (110-1) and LT-2 (110-2)). The remaining LTs 110 (e.g., LT-3 (110-3) and LT-4 (110-04)) of network portion 300 may be unused. Such an arrangement may ensure that the bandwidth demands of ONTs 140 are satisfied.

As shown in FIG. 3B, LT-1 (110-1) may include transmitter 300-1 (e.g., that transmits optical signals at the first wavelength (Xi)) and receiver 310-1 (e.g., that receives optical signals at the first wavelength ($\lambda_2$)). LT-2 (110-1) may include a transmitter 300-2 and a receiver 310-2. Transmitter 300-2 may include any device capable of transmitting optical signals (e.g., downstream traffic). In one implementation, transmitter 300-2 may include a device capable of transmitting optical signals at a third wavelength ($\lambda_3$) that is different than the first wavelength ($\lambda_1$) and the second wavelength ($\lambda_2$). Receiver 310-2 may include a device capable of receiving optical signals (e.g., upstream traffic). In one implementation, receiver 310-2 may include a device capable of receiving optical signals at a fourth wavelength ($\lambda_4$) that is different than the first wavelength ($\lambda_1$), the second wavelength ($\lambda_2$), and the third wavelength ($\lambda_3$).

As further shown in FIG. 3B, the first sixteen ONTs 140 (e.g., ONT-1 (140-1), ONT-16 (140-16)) may include receivers 320 (e.g., receivers 320-1, ..., 320-16) that are capable of receiving optical signals (e.g., downstream traffic) at the first wavelength ($\lambda_1$), and transmitters 330 (e.g., transmitters 330-1, ..., 330-16) that are capable of transmitting optical signals (e.g., upstream traffic) at the second wavelength ($\lambda_2$). The next sixteen ONTs 140 (e.g., ONT-17 (140-17), ..., ONT-32 (140-32)) may include receivers 320 (e.g., receivers 320-17, 320-32) that are capable of receiving optical signals (e.g., downstream traffic) at the third wavelength ($\lambda_3$), and transmitters 330 (e.g., transmitters 330-17, ..., 330-32) that are capable of transmitting optical signals (e.g., upstream traffic) at the fourth wavelength ($\lambda_4$). In other implementations, ONTs 140 may be divided between LT 110-1 and LT 110-2 in other ways.

In such an arrangement, LT-1 (110-1) and LT-2 (110-2) may distribute bandwidth (e.g., of "5.0" G/s) among ONTs 140. In one implementation, LT-1 (110-1) and LT-2 (110-2) may evenly distribute bandwidth among ONTs 140. In other implementations, LT-1 (110-1) and LT-2 (110-2) may allocate bandwidth to ONTs 140 based on bandwidth demands of ONTs 140.

If the bandwidth demands of ONTs 140 exceed the bandwidth provided by LT-1 (110-1) and LT-2 (110-2), network portion 300 may be upgraded by adding more operational LTs. FIG. 3C illustrates network portion 300 that may include four operational LTs 110 (e.g., LT-1 (110-1), LT-2 (110-2), LT-3 (110-3), and LT-4 (110-4)). Such an arrangement may ensure that the bandwidth demands of ONTs 140 are satisfied.

As shown in FIG. 3C, LT-1 (110-1) may include transmitter 300-1 (e.g., that transmits optical signals at the first wavelength ($\lambda_1$)) and receiver 310-1 (e.g., that receives optical signals at the first wavelength ($\lambda_2$)). LT-2 (110-2) may include transmitter 300-2 (e.g., that transmits optical signals at the third wavelength ($\lambda_3$)) and receiver 310-2 (e.g., that receives optical signals at the fourth wavelength ($\lambda_4$)).

LT-3 (110-3) may include a transmitter 300-3 and a receiver 310-3. Transmitter 300-3 may include any device capable of transmitting optical signals (e.g., downstream traffic) at a fifth wavelength ($\lambda_5$) that is different than the first wavelength ($\lambda_1$), the second wavelength ($\lambda_2$), the third wavelength ($\lambda_3$), and the fourth wavelength ($\lambda_4$). Receiver 310-3 may include a device capable of receiving optical signals (e.g., upstream traffic) at a sixth wavelength ($\lambda_6$) that is different than the first wavelength ($\lambda_1$), the second wavelength ($\lambda_2$), the third wavelength ($\lambda_3$), the fourth wavelength ($\lambda_4$), and the fifth wavelength ($\lambda_5$).

LT-4 (110-4) may include a transmitter 300-4 and a receiver 310-4. Transmitter 300-4 may include any device capable of transmitting optical signals (e.g., downstream traffic) at a seventh wavelength ($\lambda_7$) that is different than the first wavelength ($\lambda_1$), the second wavelength ($\lambda_2$), the third wavelength ($\lambda_3$), the fourth wavelength ($\lambda_4$), the fifth wavelength ($\lambda_5$), and the sixth wavelength ($\lambda_7$). Receiver 310-4 may include a device capable of receiving optical signals (e.g., upstream traffic) at an eighth wavelength ($\lambda_8$) that is different than the first wavelength ($\lambda_1$), the second wavelength ($\lambda_2$), the third wavelength ($\lambda_3$), the fourth wavelength ($\lambda_4$), the fifth wavelength ($\lambda_5$), the sixth wavelength ($\lambda_6$), and the seventh wavelength ($\lambda_7$).

As further shown in FIG. 3C, the first eight ONTs 140 (e.g., ONT-1 (140-1), ... ONT-8 (140-8)) may include receivers 320 (e.g., receivers 320-1, ..., 320-8) that are capable of receiving optical signals (e.g., downstream traffic) at the first wavelength ($\lambda_1$), and transmitters 330 (e.g., transmitters 330-1, . . . , 330-8) that are capable of transmitting optical signals (e.g., upstream traffic) at the second wavelength ($\lambda_2$). The next eight ONTs 140 (e.g., ONT-9 (140-9), . . . ONT-16 (140-16)) may include receivers 320 (e.g., receivers 320-9, . . . , 320-16) that are capable of receiving optical signals (e.g., downstream traffic) at the third wavelength ($\lambda_3$), and transmitters 330 (e.g., transmitters 330-9, . . . , 330-16) that are capable of transmitting optical signals (e.g., upstream traffic) at the fourth wavelength ($\lambda_4$). The next eight ONTs 140 (e.g., ONT-17 (140-17), . . . , ONT-24 (140-24)) may include receivers 320 (e.g., receivers 320-17, . . . , 320-24) that are capable of receiving optical signals (e.g., downstream traffic) at the fifth wavelength ($\lambda_5$), and transmitters 330 (e.g., transmitters 330-17, . . . , 330-24) that are capable of transmitting optical signals (e.g., upstream traffic) at the sixth wavelength ($\lambda_6$). The final eight ONTs 140 (e.g., ONT-25 (140-25), . . . , ONT-32 (140-32)) may include receivers 320 (e.g., receivers 320-25, . . . , 320-32) that are capable of receiving optical signals (e.g., downstream traffic) at the seventh wavelength ($\lambda_7$), and transmitters 330 (e.g., transmitters 330-25, . . . , 330-32) that are capable of transmitting optical signals (e.g., upstream traffic) at the eighth wavelength ($\lambda_8$). Other arrangements of LTS 110 and ONTs 140 are possible.

In such an arrangement, LT-1 (110-1), LT-2 (110-2), LT-3 (110-3), and LT-4 (110-4) may distribute bandwidth (e.g., of "10.0" G/s) among ONTs 140. In one implementation, LT-1 (110-1), LT-2 (110-2), LT-3 (110-3), and LT-4 (110-4) may evenly distribute bandwidth among ONTs 140. In other implementations, LT-1 (110-1), LT-2 (110-2), LT-3 (110-3), and LT-4 (110-4) may allocate bandwidth to ONTs 140 based on bandwidth demands of ONTs 140.

Although FIGS. 3A-3C show exemplary components of network portion 300, in other implementations, network portion 300 may contain fewer, different, or additional components than depicted in FIGS. 3A-3C. For example, network portion 300 may include more than four LTs 110, and/or more than thirty-two ONTs 140. In still other implementations, one or more components of network portion 300 may perform one or more other tasks described as being performed by one or more other components of network portion 300.

FIG. 4 is a diagram depicting exemplary components of a single LT 110. As illustrated, LT 110 may include transmitter 300 that includes an optical source 400 and/or a tunable filter 410, and/or receiver 310 that includes tunable filter 410. As described above, transmitter 300 may include any device capable of transmitting optical signals (e.g., downstream traffic) at a wavelength, and receiver 310 may include any device capable of receiving optical signals (e.g., upstream traffic) at a wavelength.

Optical source 400 may include any device capable of generating optical signals. For example, in one implementation, optical source 400 may include a mode locked laser (e.g., a fixed comb laser) that produces a series of optical pulses separated in time by a round-trip time of a laser cavity. A spectrum of such an optical pulse train may include a series of delta functions separated by a repetition rate (e.g., an inverse of the round-trip time) of the laser. Such a series of sharp spectral lines may form what may be referred to as a "frequency comb." In one exemplary implementation, optical source 400 may include a low cost comb laser having a narrow operation bandwidth (e.g., a range of about "6" to about "8" nanometers separated at "2" nanometers) and being capable of producing "4" to "5" laser pulses (e.g., each laser pulse may be modulated from more than zero Gbps to "10" Gbps). The laser signal may be modulated (e.g., via amplitude modulation) after it passes through tunable filter 410.

Tunable filter 410 may include any device capable of optically tuning optical signals. In one implementation, tunable filter 410 may include an optical filter that selectively transmits or receives light having certain properties (e.g., a particular range of wavelengths), while blocking the remainder of the light. For example, tunable filter 410 may include a narrow band (e.g., about six to about eight nanometers) optically tunable filter that may provide a tunability of about two nanometers per wavelength. Returning to FIG. 3C, tunable filter 410 associated with transmitter 300-1 may transmit optical signals at the first wavelength ($\lambda_1$), tunable filter 410 associated with receiver 310-1 may receive optical signals at the second wavelength ($\lambda_2$), tunable filter 410 associated with transmitter 300-2 may transmit optical signals at the third wavelength ($\lambda_3$), tunable filter 410 associated with receiver 310-2 may receive optical signals at the fourth wavelength ($\lambda_4$), etc. In one exemplary implementation, tunable filter 410 may include a low cost tunable filter having a narrow operation bandwidth (e.g., a range of about "6" to about "8" nanometers) and a tunability of "2" nanometers per step (e.g., "coarse tuning").

Although FIG. 4 shows exemplary components of LT 110, in other implementations, LT 110 may contain fewer, different, or additional components than depicted in FIG. 4. In still other implementations, one or more components of LT 110 may perform one or more other tasks described as being performed by one or more other components of LT 110.

FIG. 5 is a diagram depicting exemplary components of a single ONT 140. As illustrated, ONT 140 may include receiver 320 that includes a tunable filter 500, and/or transmitter 330 that includes an optical source 510 and/or tunable filter 500. As described above, receiver 320 may include any device capable of receiving optical signals (e.g., downstream traffic) at a wavelength, and transmitter 330 may include any device capable of transmitting optical signals (e.g., upstream traffic) at a wavelength.

Tunable filter 500 may include any device capable of optically tuning optical signals. In one implementation, tunable filter 500 may include an optical filter that selectively transmits or receives light having certain properties (e.g., a particular range of wavelengths), while blocking the remainder of the light. For example, tunable filter 500 may include a narrow band (e.g., about six to about eight nanometers) optically tunable filter that may provide tunability of about two nanometers per wavelength. Returning to FIG. 3C, tunable filters 500 associated with receivers 320-1 to 320-8 may receive optical signals at the first wavelength ($\lambda_1$), tunable filters 500 associated with transmitters 330-1 to 330-8 may transmit optical signals at the second wavelength ($\lambda_2$), tunable filters 500 associated with receivers 320-9 to 320-16 may receive optical signals at the third wavelength ($\lambda_3$), tunable filters 500 associated with transmitters 330-9 to 330-16 may transmit optical signals at the fourth wavelength ($\lambda_4$), etc. In one exemplary implementation, tunable filter 500 may include a low cost tunable filter having a narrow operation bandwidth (e.g., a range of about "6" to about "8" nanometers) and a tunability of "2" nanometers per step (e.g., "coarse tuning").

Optical source 510 may include any device capable of generating optical signals. For example, in one implementation, optical source 510 may include a mode locked laser (e.g., a fixed comb laser) that produces a series of optical pulses separated in time by a round-trip time of a laser cavity. A spectrum of such an optical pulse train may include a series of delta functions separated by a repetition rate (e.g., an inverse of the round-trip time) of the laser. Such a series of sharp spectral lines may form what may be referred to as a "frequency comb." In one exemplary implementation, optical source 510 may include a low cost comb laser having a narrow operation bandwidth (e.g., a range of about "6" to about "8" nanometers separated at "2" nanometers) and being capable of producing "4" to "5" laser pulses (e.g., each laser pulse may be modulated from more than zero Gbps to "10" Gbps). The laser signal may be modulated (e.g., via amplitude modulation) after it passes through tunable filter 500.

Optical sources 400/510 and/or tunable filters 410/500 may provide low cost, easy to produce optical sources and tunable filters in comparison to conventional high cost optical sources and/or tunable filters. For example, some conventional high cost optical sources and/or tunable filters may include "C band" or "L band" tunable optical sources and/or tunable filters having a tunable range of at least about "30" to "45" nanometers.

Although FIG. 5 shows exemplary components of ONT 140, in other implementations, ONT 140 may contain fewer, different, or additional components than depicted in FIG. 5. In still other implementations, one or more components of ONT 140 may perform one or more other tasks described as being performed by one or more other components of ONT 140.

Figure 6:
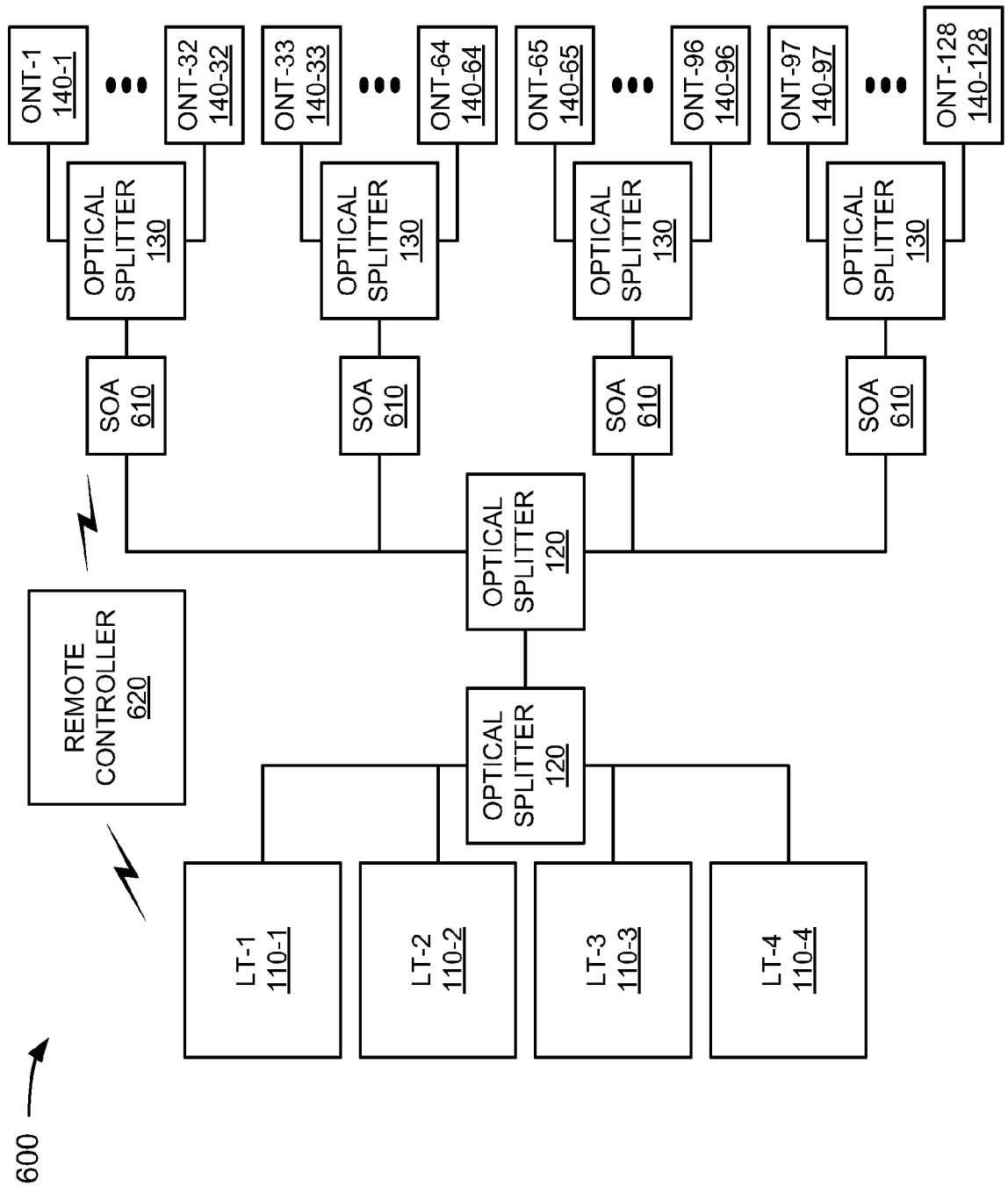
FIG. 6 is an exemplary diagram of another network in which systems and methods described herein may be implemented.

FIG. 6 is an exemplary diagram of another network 600 in which systems and methods described herein may be implemented. As illustrated, network 600 may include one or more LTs 110-1, 110-2, 110-3, and 110-4, two optical splitters 120, four optical splitters 130, one or more ONTs 140-1, 140-2, . . . , 140-128, one or more semiconductor optical amplifiers (SOA) 610, and/or a remote controller 620. Four LTs, six optical splitters, one-hundred and twenty-eight ONTs, four SOAs, and one remote controller have been illustrated in FIG. 6 for simplicity. In practice, there may be more or less LTs, optical splitters, ONTs, SOAs, and/or remote controllers. Also, in some instances, one of LTs 110 may perform one or more functions described as being performed by another one of LTs 110. In one implementation, network 600 may form a G-PON that may interconnect with one or more of customer networks 150, IP network 160, voice network 170, and/or video network 180. In other implementations, network 600 may form other types of PONs (e.g., a broadband PON (B-PON), an Ethernet PON (E-PON), etc.) that may interconnect with one or more of customer networks 150, IP network 160, voice network 170, and/or video network 180.

LTs 110, optical splitters 120, optical splitters 130, and ONTs 140 may include the components and/or features described above in connection with FIGS. 1, 3A-3C, 4, and/or 5. However, as shown in FIG. 6, optical splitter 120 (e.g., a 1:4 optical splitter) may interconnect with the other optical splitter 120 (e.g., a 1:4 optical splitter), which may interconnect with optical splitters 130 via SOAs 610. The arrangement of network 600 may accommodate up to one-hundred and twenty-eight (128) ONTs 140.

Each SOA 610 may include a semiconductor-based device that amplifies an optical signal directly, without the need to first convert the optical signal into an electrical signal. For example, in one implementation, each SOA 610 may include a SOA made from group III-V compound semiconductors, a SOA made from any direct band gap semiconductors (e.g., group II-VI compound semiconductors), a vertical-cavity SOA, etc. In other implementations, SOAs 610 may be replaced with other optical amplifiers (e.g., doped fiber amplifiers, Raman amplifiers, optical parametric amplifiers, etc.).

Remote controller 620 may include one or more server entities that gather, process, search, and/or provide information in a manner described herein. In one implementation, remote controller 620 may determine bandwidth demand for upstream and/or downstream traffic between LTs 110 and ONTs 140, and/or may dynamically tune the filters (e.g., tunable filters 410 and/or 500) to balance traffic in network 600 based on the determined bandwidth demand. Remote controller 620 may also dynamically tune the filters (e.g., tunable filters 410 and/or 500) to protect the traffic in network 600, and/or to increase bandwidth for the traffic based on the determined bandwidth demand. In other implementations, remote controller 620 may adjust tunable filters 410 and/or 500 to wavelengths (e.g., the first wavelength ($\lambda_1$), the second wavelength ($\lambda_2$), the third wavelength ($\lambda_3$), the fourth wavelength ($\lambda_4$), the fifth wavelength ($\lambda_5$), the sixth wavelength ($\lambda_6$), the seventh wavelength ($\lambda_7$), and/or the eighth wavelength ($\lambda_8$)).

Although FIG. 6 shows exemplary components of network 600, in other implementations, network 600 may contain fewer, different, or additional components than depicted in FIG. 6. In still other implementations, one or more components of network 600 may perform one or more other tasks described as being performed by one or more other components of network 600.

FIG. 7 is an exemplary diagram of remote controller 620. As illustrated, remote controller 620 may include a bus 710, a processing unit 720, a main memory 730, a read-only memory (ROM) 740, a storage device 750, an input device 760, an output device 770, and/or a communication interface 780. Bus 710 may include a path that permits communication among the components of remote controller 620.

Processing unit 720 may include a processor, microprocessor, or other type of processing logic that may interpret and execute instructions. Main memory 730 may include a random access memory (RAM) or another type of dynamic storage device that may store information and instructions for execution by processing unit 720. ROM 740 may include a ROM device or another type of static storage device that may store static information and/or instructions for use by processing unit 720. Storage device 750 may include a magnetic and/or optical recording medium and its corresponding drive.

Input device 760 may include a mechanism that permits an operator to input information to remote controller 620, such as a keyboard, a mouse, a pen, a microphone, voice recognition and/or biometric mechanisms, etc. Output device 770 may include a mechanism that outputs information to the operator, including a display, a printer, a speaker, etc. Communication interface 780 may include any transceiver-like mechanism that enables remote controller 620 to communicate with other devices and/or systems. For example, communication interface 780 may include mechanisms for communicating with another device or system via a network, such as network 600.

As described herein, remote controller 620 may perform certain operations in response to processing unit 720 executing software instructions contained in a computer-readable medium, such as main memory 730. A computer-readable medium may be defined as a physical or logical memory device and/or carrier wave. The software instructions may be read into main memory 730 from another computer-readable medium, such as storage device 750, or from another device via communication interface 780. The software instructions contained in main memory 730 may cause processing unit 720 to perform processes that will be described later. Alternatively, hardwired circuitry may be used in place of or in combination with software instructions to implement processes described herein. Thus, implementations described herein are not limited to any specific combination of hardware circuitry and software.

Although FIG. 7 shows exemplary components of remote controller 620, in other implementations, remote controller 620 may contain fewer, different, or additional components than depicted in FIG. 7. In still other implementations, one or more components of remote controller 620 may perform one or more other tasks performed by one or more other components of remote controller 620.

FIG. 8 depicts a flow chart of an exemplary process 800 for configuring upstream and downstream traffic (e.g., optical signals) between one or more LTs and one or more ONTs of a network according to implementations described herein. In one implementation, process 800 may be performed by remote controller 620. As illustrated, process 800 may begin with adjustment of upstream optical signals between a first LT and one or more ONTs to a first wavelength ($\lambda_1$) (block 810), and adjustment of downstream optical signals between the first LT and the one or more ONTs to a second wavelength ($\lambda_2$) (block 820). For example, in one implementation, remote controller 620 may adjust a tunable filter (e.g., tunable filter 410) of transmitter 300-1 of LT 110-1 to transmit downstream traffic to ONT 140-1 at the first wavelength ($\lambda_1$), and/or may adjust a tunable filter (e.g., tunable filter 500) of receiver 320-1 of ONT 140-1 to receive downstream traffic from LT 110-1 at the first wavelength ($\lambda_1$). In another implementation, remote controller 620 may adjust a tunable filter (e.g., tunable filter 410) of receiver 310-1 of LT 110-1 to receive upstream traffic from ONT 140-1 at the second wavelength ($\lambda_2$), and/or may adjust a tunable filter (e.g., tunable filter 500) of transmitter 330-1 of ONT 140-1 to transmit upstream traffic to LT 110-1 at the second wavelength ($\lambda_2$).

As further shown in FIG. 8, it may be determined if a second LT is to be added (block 830). For example, in one implementation, remote controller 620 may determine if a second LT (e.g., LT 110-2) has been added to network 600, and/or whether the second LT is operational.

As also shown in FIG. 8, if the second LT is not to be provided (block 830—NO), process 800 may end. Otherwise (block 830—YES), upstream optical signals between the second LT and a portion of the one or more ONTs may be adjusted to a third wavelength ($\lambda_3$) (block 840), and downstream optical signals between the second LT and the portion of the one or more ONTs may be adjusted to a fourth wavelength ($\lambda_4$) (block 850). For example, in one implementation, remote controller 620 may adjust a tunable filter (e.g., tunable filter 410) of transmitter 300-2 of LT 110-2 to transmit downstream traffic to ONTs 140-17 to 140-32 at the third wavelength ($\lambda_3$), and/or may adjust a tunable filter (e.g., tunable filter 500) of receivers 320-17 to 320-32 of ONTs 140-17 to 140-32 to receive downstream traffic from LT 110-2 at the third wavelength ($\lambda_3$). In another implementation, remote controller 620 may adjust a tunable filter (e.g., tunable filter 410) of receiver 310-2 of LT 110-2 to receive upstream traffic from ONTs 140-17 to 140-32 at the fourth wavelength ($\lambda_4$), and/or may adjust a tunable filter (e.g., tunable filter 500) of transmitters 330-17 to 330-32 of ONTs 140-17 to 140-32 to transmit upstream traffic to LT 110-2 at the fourth wavelength ($\lambda_4$).

FIG. 9 depicts a flow chart of an exemplary process 900 for configuring a network of one or more LTs and one or more ONTs according to implementations described herein. In one implementation, process 900 may be performed by remote controller 620. As illustrated, process 900 may begin with providing one or more optically tunable filters in a network with an LT and one or more ONTs (block 910). For example, in one implementation, a network (e.g., network 600) may include at least one LT (e.g., LT 110-1) and one or more ONTs (e.g., ONTs 140-1 to 140-128). The LT and the ONTs may include optically tunable filters (e.g., tunable filters 410 and tunable filters 500, respectively).

As further shown in FIG. 9, a bandwidth demand for upstream and/or downstream traffic between the LT and the one or more ONTs may be determined (block 920). For example, in one implementation described above in connection with FIG. 6, remote controller 620 may determine bandwidth demand for upstream and/or downstream traffic between the LTs 110 and the ONTs 140.

Returning to FIG. 9, the one or more tunable filters may be dynamically tuned to balance traffic (block 930), to protect the traffic (block 940), and/or to increase the bandwidth available for the traffic (block 950) based on the determined bandwidth demand. For example, in one implementation described above in connection with FIG. 6, remote controller 620 may dynamically tune the filters (e.g., tunable filters 410 and/or 500) to balance traffic in network 600 based on the determined bandwidth demand. Remote controller 620 may also dynamically tune the filters (e.g., tunable filters 410 and/or 500) to protect the traffic in network 600, and/or to increase bandwidth for the traffic based on the determined bandwidth demand. In another implementation, remote controller 620 may adjust tunable filters 410 and/or 500 to wavelengths (e.g., to one or more of the first wavelength ($\lambda_1$), the second wavelength ($\lambda_2$), the third wavelength ($\lambda_3$), the fourth wavelength ($\lambda_4$), the fifth wavelength ($\lambda_5$), the sixth wavelength ($\lambda_6$), the seventh wavelength ($\lambda_7$), and/or the eighth wavelength ($\lambda_8$)).

Implementations described herein may include systems and methods that provide dynamically tunable filters in a network (e.g., a G-PON) that includes one or more LTs (e.g., at a central office) and one or more ONTs (e.g., at end users' premises). For example, in one implementation, the systems and methods may determine bandwidth demand for upstream and/or downstream traffic between the LTs and the ONTs, and/or may dynamically tune the filters to balance traffic based on the determined bandwidth demand. The systems and methods may also dynamically tune the filters to protect the traffic and/or to increase bandwidth for the traffic based on the determined bandwidth demand.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 8 and 9, the order of the acts may be modified in other implementations. Further, non-dependent acts may be performed in parallel.

Also, the terms "user" and "customer" have been used herein. The terms "user" and "customer" are intended to be broadly interpreted to include an ONT (e.g., ONT 140) or a user or customer of an ONT.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
    a line terminal (LT) that includes:
        a LT transmitter that includes a first LT tunable filter that is capable of transmitting downstream optical signals at a first wavelength, and
        a LT receiver that includes a second LT tunable filter that is capable of receiving upstream optical signals at a second wavelength; and
    one or more optical network terminals (ONTs), each ONT including:
        an ONT receiver that includes a first ONT tunable filter that is capable of receiving the downstream optical signals at the first wavelength, and
        an ONT transmitter that includes a second ONT tunable filter that is capable of transmitting the upstream optical signals at the second wavelength,
    where the LT transmitter and the ONT transmitter each comprise a fixed comb laser that includes an operation bandwidth range of about six nanometers to about eight nanometers, and produces four to five laser pulses, where each laser pulse is modulated from more than zero gigabits per second (Gbps) to ten Gbps.

2. The system of claim 1, further comprising:
    an optical splitter that splits the downstream optical signals between the one or more ONTs.

3. The system of claim 2, where the optical splitter comprises an optical device that splits optical signals into multiple paths.

4. The system of claim 2, further comprising:
    one or more optical amplifiers, provided between the optical splitter and the one or more ONTs, that amplifies the upstream and downstream optical signals.

5. The system of claim 4, where the one or more optical amplifiers comprise one or more semiconductor optical amplifiers.

6. The system of claim 1, further comprising:
    a remote controller that controls one or more of the first LT tunable filter, the second LT tunable filter, the first ONT tunable filter, and the second ONT tunable filter.

7. The system of claim 6, where the remote controller adjusts the wavelengths of the upstream and downstream optical signals by controlling one or more of the first LT tunable filter, the second LT tunable filter, the first ONT tunable filter, and the second ONT tunable filter.

8. The system of claim 6, where the remote controller comprises processing logic configured to:
    adjust the downstream optical signals transmitted by the LT transmitter and received by each ONT receiver to the first wavelength; and
    adjust the upstream optical signals transmitted by each ONT transmitter and received by the LT receiver to the second wavelength.

9. The system of claim 8, further comprising:
    a second LT that includes a second LT transmitter capable of transmitting downstream optical signals at a third wavelength, and a second LT receiver capable of receiving upstream optical signals at a fourth wavelength; and
    wherein the remote controller further comprises processing logic configured to:
        adjust the downstream optical signals transmitted by the second LT transmitter and received by a portion of the one or more ONTs to the third wavelength; and
        adjust the upstream optical signals transmitted by the portion of the one or more ONTs and received by the second LT receiver to the fourth wavelength.

10. The system of claim 6, where the remote controller comprises processing logic configured to:
    determine a bandwidth demand for the upstream and the downstream optical signals; and
    dynamically tune one or more of the first LT tunable filter, the second LT tunable filter, the first ONT tunable filter, and the second ONT tunable filter to balance the upstream and the downstream optical signals based on the determined bandwidth demand.

11. The system of claim 6, where the remote controller comprises processing logic configured to:
    determine a bandwidth demand for the upstream and the downstream optical signals; and
    dynamically tune one or more of the first LT tunable filter, the second LT tunable filter, the first ONT tunable filter, and the second ONT tunable filter to protect the upstream and downstream optical signals based on the determined bandwidth demand.

12. The system of claim 6, where the remote controller comprises processing logic configured to:
    determine a bandwidth demand for the upstream and the downstream optical signals; and
    dynamically tune one or more of the first LT tunable filter, the second LT tunable filter, the first ONT tunable filter, and the second ONT tunable filter to increase bandwidth for the upstream and downstream optical signals based on the determined bandwidth demand.

13. The system of claim 1, where the system comprises a passive optical network.

14. The system of claim 13, where the passive optical network comprises a gigabit passive optical network.

15. The system of claim 1, where each of the first LT tunable filter, the second LT tunable filter, the first ONT tunable filter, and the second ONT tunable filter comprises an operation bandwidth range of about six nanometers to about eight nanometers and a tunability of two nanometers per step.

16. A method, comprising:
    adjusting, to a first wavelength, upstream optical signals provided between a first line terminal (LT) and a plurality of optical network terminals (ONTs) by tuning one or more tunable filters provided in the first LT and the plurality of ONTs;
    adjusting, to a second wavelength, downstream optical signals provided between the first LT and the plurality of ONTs by tuning the one or more tunable filters provided in the first LT and the plurality of ONTs;

transmitting at least one upstream optical signal between the first LT and an ONT of the plurality of ONTs at the first wavelength; and transmitting at least one downstream optical signal between the first LT and the ONT of the plurality of ONTs at the second wavelength, where the first LT and the ONT of the plurality of ONTs each comprise a fixed comb laser that includes an operation bandwidth range of about six nanometers to about eight nanometers, and produces four to five laser pulses, where each laser pulse is modulated from more than zero gigabits per second (Gbps) to ten Gbps.

17. The method of claim 16, further comprising:

adjusting, to a third wavelength, upstream optical signals provided between a second LT and the plurality of ONTs by tuning one or more tunable filters provided in the second LT and a portion of the plurality of ONTs;

adjusting, to a fourth wavelength, downstream optical signals provided between the second LT and the portion of the plurality of ONTs by tuning the one or more tunable filters provided in the second LT and the portion of the plurality of ONTs;

transmitting at least one upstream optical signal between the second LT and an ONT of the plurality of ONTs at the third wavelength; and transmitting at least one downstream optical signal between the second LT and the ONT of the plurality of ONTs at the fourth wavelength.

18. The method of claim 16, further comprising:

determining a bandwidth demand for the upstream and the downstream optical signals; and dynamically tuning the one or more tunable filters provided in the first LT and the plurality of ONTs to balance the upstream and the downstream optical signals based on the determined bandwidth demand.

19. The method of claim 16, further comprising:

determining a bandwidth demand for the upstream and the downstream optical signals; and dynamically tuning the one or more tunable filters provided in the first LT and the plurality of ONTs to protect the upstream and the downstream optical signals based on the determined bandwidth demand.

20. The method of claim 16, further comprising:

determining a bandwidth demand for the upstream and the downstream optical signals; and dynamically tuning the one or more tunable filters provided in the first LT and the plurality of ONTs to increase bandwidth for the upstream and the downstream optical signals based on the determined bandwidth demand.

21. A device comprising:

means for determining a bandwidth demand for traffic provided between a line terminal (LT) and a plurality of optical network terminals (ONTs); and means for dynamically tuning, based on the determined bandwidth demand, one or more tunable filters provided in the LT and the plurality of ONTs to one of balance the traffic, protect the traffic, or increase available bandwidth for the traffic, where the LT and the plurality of ONTs each comprise a fixed comb laser that includes an operation bandwidth range of about six nanometers to about eight nanometers, and produces four to five laser pulses, where each laser pulse is modulated from more than zero gigabits per second (Gbps) to ten Gbps.

22. The device of claim 21, further comprising:

means for adjusting, to a first wavelength, a portion of the traffic by tuning the one or more tunable filters provided in the LT and the plurality of ONTs; and means for adjusting, to a second wavelength, another portion of the traffic by tuning the one or more tunable filters provided in the LT and the plurality of ONTs.

23. A line terminal (LT) comprising:

a LT transmitter that includes:

a first LT tunable filter to transmit downstream optical signals at a first wavelength, and a fixed comb laser that includes an operation bandwidth range of about six nanometers to about eight nanometers, and produces four to five laser pulses, where each laser pulse is modulated from more than zero gigabits per second (Gbps) to ten Gbps; and a LT receiver that includes a second LT tunable filter to receive upstream optical signals at a second wavelength.

* * * * *